US00RE37496B1

(19) United States
(12) Reissued Patent
Mori et al.

(10) Patent Number: US RE37,496 E
(45) Date of Reissued Patent: *Jan. 1, 2002

(54) METHOD OF EXECUTING A JOB

(75) Inventors: Kinji Mori, Kawasaki; Hirokazu Ihara, Machida, both of (JP)

(73) Assignee: Hitachi, LTD, Tokyo (JP)

( * ) Notice: This patent issued on a continued prosecution application filed under 37 CFR 1.53(d), and is subject to the twenty year patent term provisions of 35 U.S.C. 154(a)(2).

(21) Appl. No.: 08/668,201

(22) Filed: Jun. 20, 1996

Related U.S. Patent Documents

Reissue of:
(64) Patent No.: 4,462,075
Issued: Jul. 24, 1984
Appl. No.: 06/337,452
Filed: Jan. 6, 1982

U.S. Applications:
(63) Continuation of application No. 08/436,862, filed on May 8, 1995, now abandoned, which is a continuation of application No. 07/625,779, filed on Dec. 7, 1990, now abandoned, which is a continuation of application No. 06/894,820, filed on Jul. 24, 1986, now abandoned.

(30) Foreign Application Priority Data

Jan. 21, 1981 (JP) ..... 56-6398

(51) Int. Cl.[7] ..... G06F 15/16
(52) U.S. Cl. ..... 709/202
(58) Field of Search ..... 395/200.32; 707/202

(56) References Cited

U.S. PATENT DOCUMENTS 3,593,300 A * 7/1971 Driscoll, Jr. et al. ..... 395/650
3,665,404 A * 5/1972 Werner ..... 395/725
3,702,006 A * 10/1972 Page ..... 395/650
3,755,789 A * 8/1973 Collins ..... 395/550
3,970,994 A * 7/1976 Jenny ..... 395/325
4,007,450 A * 2/1977 Haibt et al. ..... 395/200

(List continued on next page.)

FOREIGN PATENT DOCUMENTS

JP 0066039 * 5/1980 ..... 371/11

OTHER PUBLICATIONS

Marsicek RR, et al. "Distributed Data Processing System," IBM Technical Disclosure Bulletin, Oct. 1980, pp 1805–1810.*
Sams JG, "Node Processor for Distributed System Control," IBM Technical Disclosure Bulletin, Oct. 1980, pp. 1811–1812.*
Arnold et al, "A Hierarchical Restructurable Multi–Microprocessor Architecture", Jan. 19, 1976, pp 40–45.*

*Primary Examiner*—Jack M. Choules
(74) *Attorney, Agent, or Firm*—Antonelli, Terry, Stout & Kraus, LLP

(57) ABSTRACT

A job processing method is provided for use in an information processing system including three or more information processing devices connected to a common transmission line:

(a) first of all, in case the occurrence of a job is detected at one of the three or more processing devices, it is broadcast to the remaining plural processing device;
(b) next, that job execution for that job is started at a first processing device which is one of the plural processing devices receiving the job occurrence broadcast or the processing device having broadcast the job occurrence;
(c) then, the first processing device having started that job execution is monitored at the others of the plural processing devices which are not presently involved in that job execution but have been informed of that job occurrence; and
(d) the job is executed irrespective of the presence of an abnormal processing device in case a second processing device, which is one of the plural monitoring processing devices, detects an abnormality of the processing device executing that job.

41 Claims, 10 Drawing Sheets

U.S. PATENT DOCUMENTS 4,096,571 A * 6/1978 Vander Mey ..... 364/200
4,099,235 A * 7/1978 Hoschler et al. ..... 364/200
4,183,083 A * 1/1980 Chatfield ..... 364/200
4,228,496 A * 10/1980 Katzman et al. ..... 395/200
4,262,331 A * 4/1981 Freeland et al. ..... 364/200
4,276,593 A * 6/1981 Hansen ..... 364/184
4,319,338 A * 3/1982 Grudowski et al. ..... 364/900
4,323,966 A * 4/1982 Whiteside et al. ..... 371/62 X
4,358,823 A * 11/1982 McDonald et al. ..... 395/575
4,366,535 A * 12/1982 Cedolin et al. ..... 395/325

* cited by examiner

METHOD OF EXECUTING A JOB

Matter enclosed in heavy brackets [ ] appears in the original patent but forms no part of this reissue specification; matter printed in italics indicates the additions made by reissue.

*This application is a continuation of Ser. No. 08/436,862, filed on May 8, 1995, now abandoned which is a continuation of Ser. No. 07/625,779 filed on Dec. 7, 1990, now abandoned which is a Continuation of application Ser. No. 06/894,820, filed Jul. 24, 1986 now abandoned which is a Reissue application of U.S. Pat. No. 4,462,075 issued Jul. 24, 1984.*

BACKGROUND OF THE INVENTION

1. Field of the Invention

The present invention relates to a job processing method for an information processing system which includes a plurality of information processing devices connected to a common transmission line. More specifically, the present invention relates to a job processing method for executing a job in a reliable manner, even if an abnormality occurs in the processing device executing the job, by use of the remaining processing devices.

2. Description of the Prior Art

In the case where a job request has occurred in an information processing system including a plurality of information processing devices, that job has been executed according to the prior art in the following different ways:

(1) the job is executed by the processing device which has detected the job request occurrence; or (2) that processing device which detects the job request demands that another processing device perform the execution of that job so that the job may be executed by the other processing device.

In the aforementioned case (1), there arises a disadvantage in that the job is not executed if the processing device having detected the job request becomes abnormal and is disabled.

In the aforementioned case (2), the first processing device having referred the job execution to a second processing device keeps monitoring the second processing device to which the job has been referred. Therefore, when the second processing device having the task of executing the job becomes disabled, the first processing device can detect that disorder so that the job can be assigned another processing device for execution. However, there arises a disadvantage in that the job cannot be executed when both the first and second processing devices becomes disabled at the same time.

SUMMARY OF THE INVENTION

The present invention has been conceived to eliminate the disadvantages concomitant with the prior art thus far described and has an object to provide a job processing device for an information processing system, in which, even if an abnormality occurs in either the processing device which has detected the occurrence of a job request or a processing device to which the job execution has been referred by the former device, that job can be executed by means of the remaining processing devices.

According to the present invention, there is provided a job processing method for use in an information processing system including three or more information processing devices connected with a common transmission line:

(a) First of all, in the case where the occurrence of a job request is detected at one of the three or more processing devices, this condition is broadcast on the transmission line to the remaining plural processing devices;

(b) Next, job execution is started at a first processing device which is any one of the plural processing devices informed of the job request occurrence or the processing device having broadcast the job request occurrence;

(c) Then, the first processing device having started that job execution is monitored by the others of the plural processing devices which are not presently involved in that job execution, but have been informed of that job request occurrence; and (d) The job is executed irrespective of the presence of an abnormal processing device in case a second processing device, which is one of the plural monitoring processing devices, detects an abnormality of the processing device executing that job.

DESCRIPTION OF THE PREFERRED EMBODIMENTS

Figure 1:
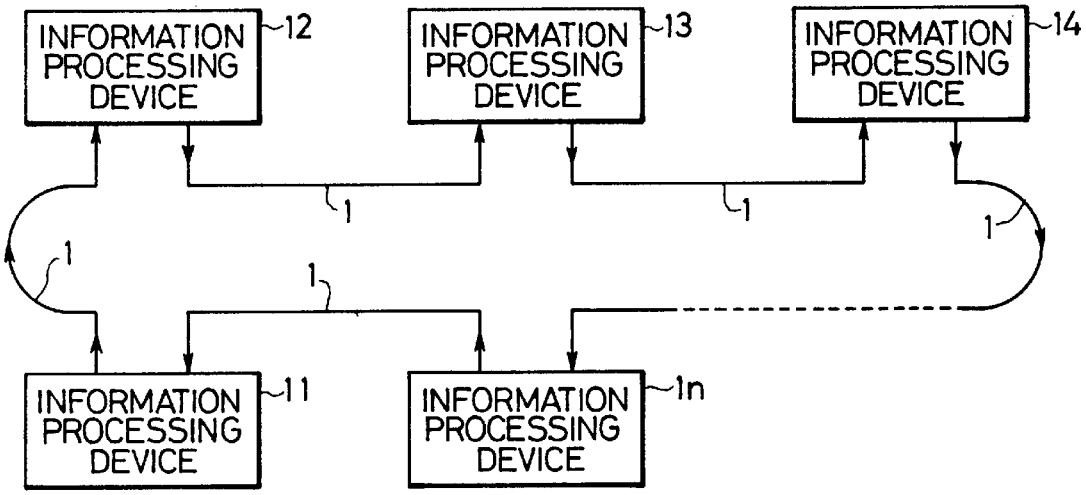
FIG. 1 is a block diagram showing the overall construction of a loop transmission system to which the present invention is applied.
Figure 2:
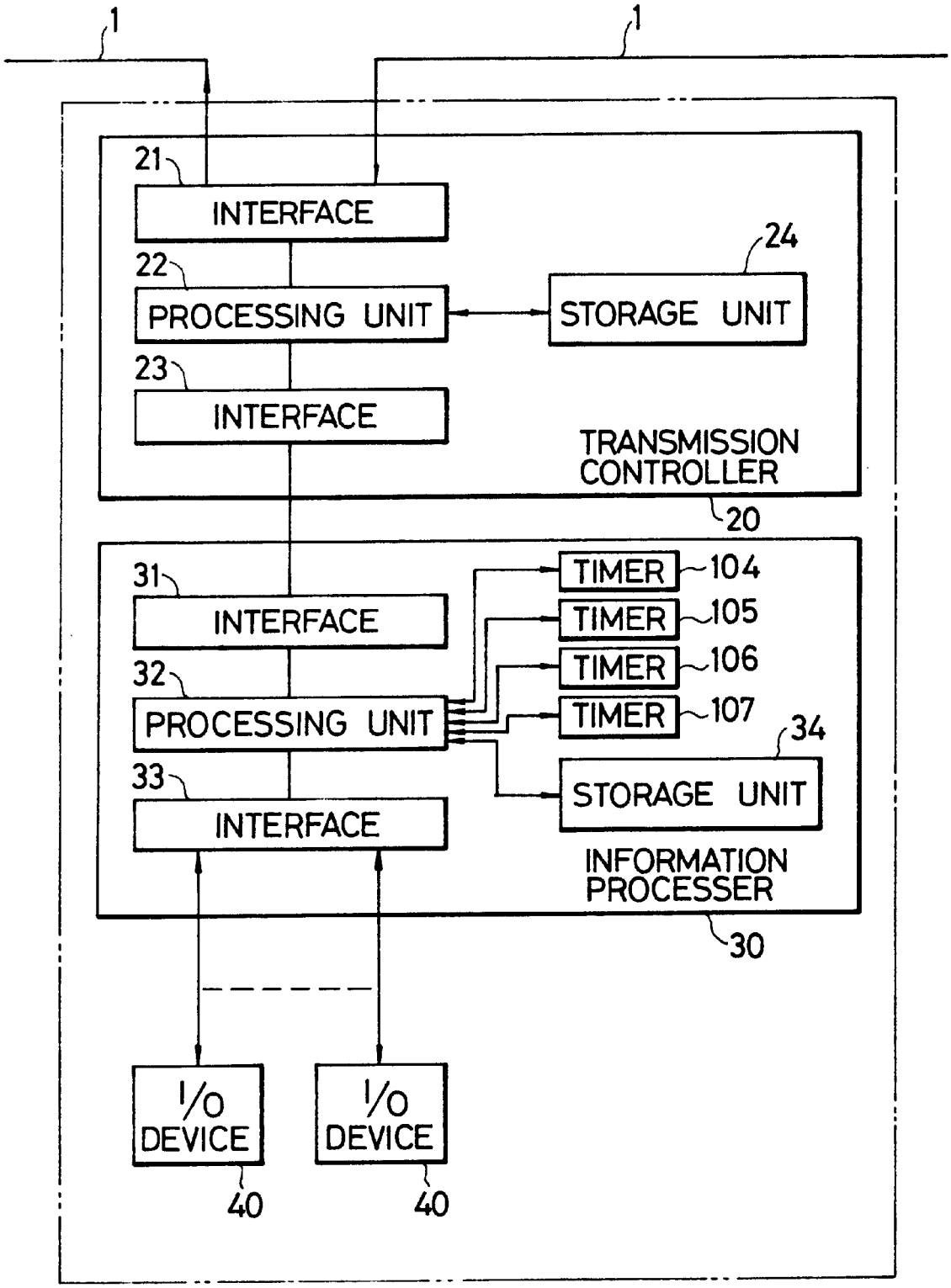
FIG. 2 is a block diagram showing one embodiment of an information processing device according to the present invention.

The present invention will now be described in detail by way of an example of an information processing system using a loop transmission. FIG. 1 shows the overall construction of that system. In FIG. 1, reference numeral 1 indicates a uni-directional loop transmission line acting as a common transmission line, in which three or more information processors having an identical construction are coupled. The construction of an ith information processor 1i is shown in FIG. 2 by way of an example. Each information processor is composed of a transmission controller 20, an information processor 30 and a plurality of I/O devices 40.

Next, the operations will be described in the order of the following items:

(1) Detection of Job Occurrence Request and Transmission of Job Occurrence Message;

(2) Reception of Job Occurrence Message at other Processors;

(3) Execution of Job;

(4) Monitor of Job Execution; and (5) Abnormal Detection and Processings therefor.

Figure 4:
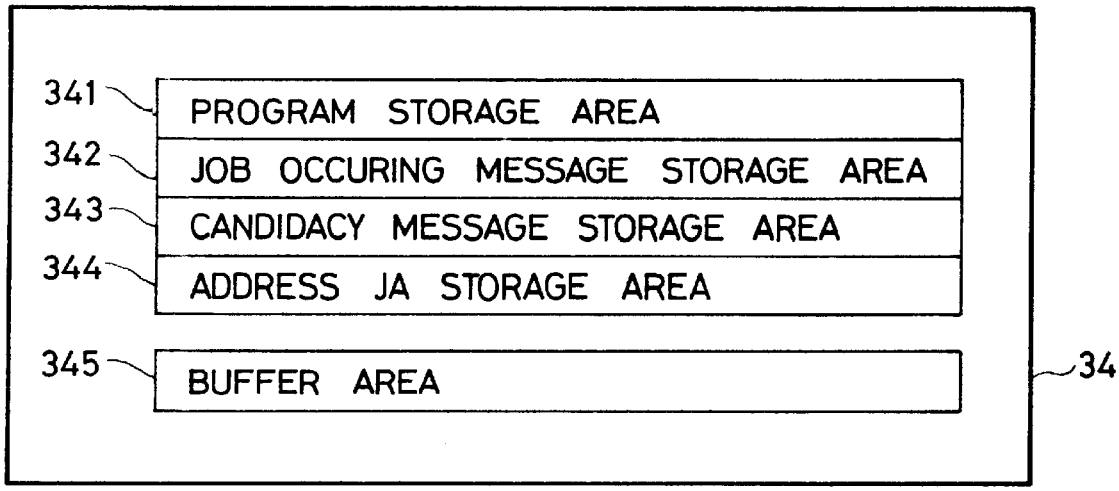
FIG. 4 is a schematic diagram showing the construction of one example of a storage unit in the information processor of FIG. 2.

(1) Detection of Job Occurrence Request and Transmission of Job Occurrence Message The following description is directed by way of an example to the case in which, when trouble occurs in a signal device for trains, its cause is automatically analyzed so that a maintenance man is informed *of* the problem [of]. Let it be assumed that the trouble in a certain signal device (although not shown) is detected by one of the plural I/O devices 40 of a processor 11. Then, this I/O device sends code data SAB indicative of the trouble in the signal device, number data SNO identifying the signal device, and data SDA concerning the signal device to the information processor 30. A processing unit 32 in that information processor 30 detects, when it receives the data SAB, SNO and SDA through an interface 33, that a job to be processed has been requested. The processing unit 32 partly stores this data SAB, SNO and SDA in a job occurrence message storage area 342 of a storage unit 34 as is shown in FIG. 4 and partly sends this data to transmission controller 20.

Figure 3:
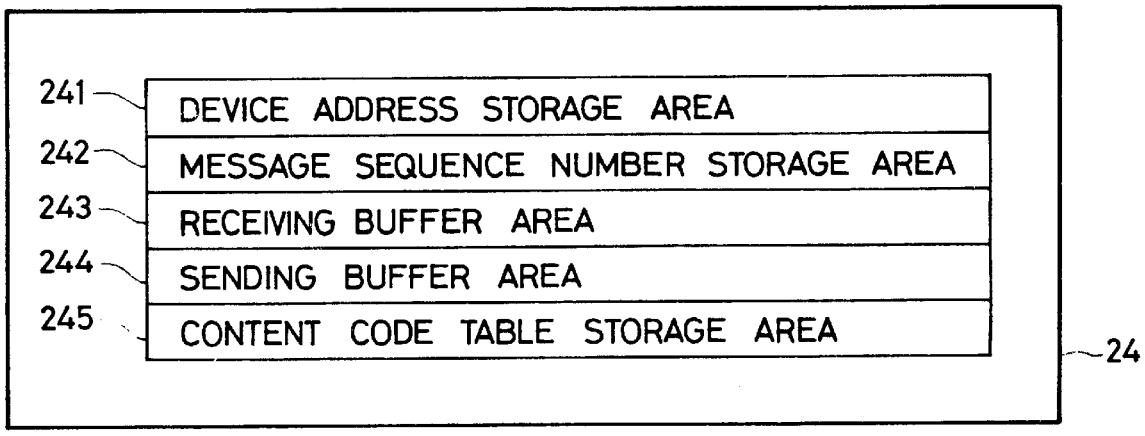
FIG. 3 is a schematic diagram showing the construction of one example of a storage unit in the transmission controller of FIG. 2.
Figure 5:
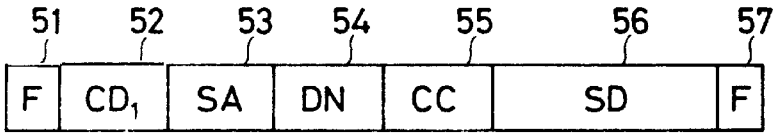
FIG. 5 is a schematic diagram showing the construction of one example of a job occurrence message according to the present invention.

The construction of a storage unit 24 in the transmission controller 20 is shown in FIG. 3. A processing unit 22 in the transmission controller 20 reads out, when it receives the data SAB, SNO and SDA through an interface 23, both the device address data "11", which is stored in a device address storage area 241 of the storage unit 24, and the message sequence number data "0" which is stored in a message sequence number storage area 242, which is set at "0" at this point because it is assumed that no message M has been sent as yet from that information processor 11. And, a sending buffer area 244 is set with a job occurrence message Jm, having a format as shown in FIG. 5. Reference letters F appearing in areas 51 and 57 of the message Jm designate flags indicative of the leading and trailing portions of the message. An area 52 is set with code data $CD_1$ indicating that the message is a job occurrence message (other types of code data indicate other types of messages). An area 53 is one which is to be set with a sender address SA and is set in this case with the address "11" of the aforementioned processor 11 as the address SA. An area 54 is to be set with a message sequence number DN and is set in this case with the summed value "1" of the previous sequence number "0" and an incremented valve "1". At this time, the value of the message sequence number storage area 242 is counted up only one for the subsequent message sent. An area 55 is to be set with a content code CC (which will be detailed later) and is set in this case with the code data SAB obtained from the I/O device 40 which has detected the trouble in the signal device and which identifies the aforementioned trouble of the signal device. An area 56 is one which is to be set with sub-data SD (which will be detailed later) and is set in this case with both the number SNO of the aforementioned troubled signal device and the data SDA concerning that signal device.

The processing unit 22 sends a copy of the job occurrence message Jm, which has been stored in the sending buffer area 244, to the transmission loop 1 through an interface 21.

Figure 6:
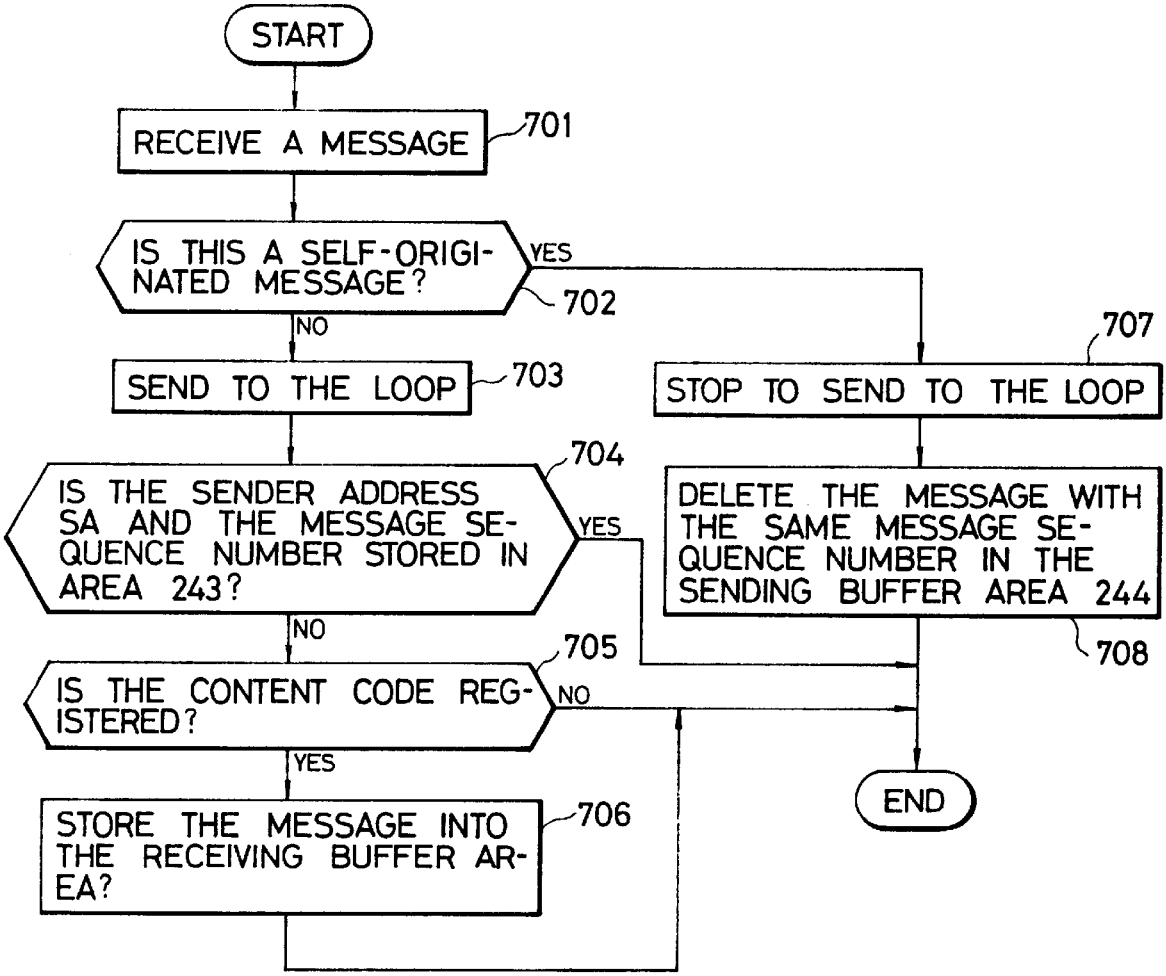
FIG. 6 is a flow chart showing one example of the message receiving process of the transmission controller of FIG. 2.

Thus, the job occurrence message JM sent from the information processor 11 circulates once through information processors 12, 13, - - - , and 1n until it returns to the information processor 11. FIG. 6 shows one example of the message receiving process at the processing unit 22 of the transmission controller 20. On the other hand, FIGS. 7(A) to (E) show a variety of processing examples at the processing unit 32 of the information processor 11. The operations of the information processor according to the present invention will be described in the following with reference to those Figures. The processing unit 22 in the information processor 11 starts, when it receives that message JM through the interface 21 (at a process 701 of FIG. 4) and detects the sender address SA and the sequence number DN, which are in a predetermined positional relationship from the start flag F. The sender address SA and the address stored in the device address storage area 241 of the information processor 11 are compared (at a process 702 of FIG. 6). In this case, they are coincident. Therefore, it is possible to detect that the message JM is one which has been sent from the processor 11. Since that message JM is a self-sent [again] one, it need not be sent so that it is prevented from being sent from the processor 11 to the processor 12 (at a process 707 of FIG. 6). In other words, that message JM is taken out of the loop transmission line 1. Next, it is determined whether a message having the same sequence number is stored in the sending buffer area 244. In this case, the area 244 stores the same job occurrence message JM as that received so that the sequence numbers of the messages received and stored are coincident. Therefore, the coincident message stored in the area 244 is unnecessary and is deleted, because it is judged at this point that that message JM has been transmitted successfully to the respective devices in the system (at a process 708 of FIG. 6).

However, when a message which is stored in the sending buffer area 244 is not deleted from that area 244 after a predetermined period has elapsed after the message sending operation from that area 244, the processing unit 22 judges that the message has been sent out once but has not returned, and therefore sends it again.

The sending process of the job occurrence message is completed in the manner thus far described.

Incidentally, the sequence number DN is used to discriminate the messages having a common information processor as their sender. More specifically, in case a plurality of messages having a common information processor as their sender are sent, the sequence number DN is used to judge which message circulates once but fails to return.

The aforementioned content code CC indicates the content of the general concept expressed by the data and is used to classify the data according to type, and therefore, it has a limited number of different combinations.

In contrast, the aforementioned sub-data SD concerns the content code and the so-called "variable parameter" or the like for specifically supplementing the concept of the content code with numerical values or the like thereby to provide control data associated with the content code so that the content to be designated thereby is substantially infinite.

In a system relating to trains, for example, the items of Table 1 are some examples of the content code and the subdata:

TABLE 1

| Content of Control Data | Content Code | Sub-Data |
|---|---|---|
| The work begins at 4:30. | Beginning Code | Data of 4:30 |
| The work ends at 23:50. | Ending Code | Data of 23:50 |
| The train M5 was troubled at the station F at 12:00. | Trouble Code | Data of Station F, Train M5 & 12:00 |
| The train M10 left the station G at 12:30. | Pursuit Code | Data of Station G, Train M10 & 12:30 |

TABLE 1-continued

| Content of Control Data | Content Code | Sub-Data |
|---|---|---|
| The signal device 90 is abnormal, and the data for its analysis are SDA. | Signal Device Abnormal Code (SDA) | Signal Device 90 (SNO) & Data (SDA) |
| — | — | — |
| — | — | — |
| — | — | — |
| — | — | — |

(2) Reception of Job Occurrence Message at Other Processors

Next, the reception at the other processors of the job occurrence message sent from the processor 11 in the aforementioned manner will be described in the following. The transmission controller 20 of each of the processors 12, 13, 14, - - - , and 1n, which are not the senders of that message, first judges, when it receives that job occurrence message JM (at the process 701 of FIG. 6), whether or not it is a self-sent message (at the process 702 of FIG. 6). More specifically, the processing unit 22 in the transmission controller 20 receives that message JM (which has a construction such as shown in FIG. 5) through the interface 21. The sender address SA of the area 53, which is arranged at a predetermined position with respect to the position of the flag F of the start area 51 of that message, is detected and compared with the device address which is stored in the area 241 of the storage unit 24. In this case, no coincidence takes place, so that the message JM is transferred to the transmission loop 1. It is judged (simultaneously with a process 703 of FIG. 6) whether or not there is coincidence in a receiving buffer area 243 between that message JM and the sender address SA and sequence number DN of the transmission loop 1 (at a process 704 of FIG. 6). In this case, there is no storage of this message in the area 243, and it is judged that no coincidence takes place. In other words, it is found that the message JM represents the first reception of that message at this processor. Next, in accordance with whether or not the content code of that message JM is registered in a content code table storage area 245, it is judged whether or not that message JM is to be processed somehow by the processor itself (at a process 705 of FIG. 6). The area 245 of each of the processors stores in advance a plurality of content codes identifying those jobs to be processed by the respective processors. Now, let it be assumed that the same content code as the code data SAD indicative of the abnormality in the signal device, i.e., the content code of that message JM, is registered in the areas 245 of those processors 12, 13 and 14 of the processors 12, 13, - - - , and 1n, but not in the areas of the remaining processors.

In this case, the execution of the job is limited to the processors 12, 13 and 14 in which the results of the judging process 705 is YES. Therefore, that message JM is stored only in the receiving buffer areas 243 of the processors 12, 13 and 14 (at a process 706 of FIG. 6). The result is that the remaining processors do not store that message JM.

In the manners thus far described, the job occurrence message JM is received by the plural information processors.

Next, at each of the information processors which have received and stored that message JM, a judging process is performed for judging whether or not the job relating to the message JM is to be executed by the processor itself or whether or not the execution of that job simply is to be monitored by that processor. That judging process is performed in the following way.

The processing units 22 in each of the processors 12, 13 and 14 inform the processing unit 32 therein of the fact that there is in the receiving buffer area 243 a message which has not been read yet. The processing unit 32, when it receives that information, sets an interrupt flag ORF to "1", if it is involved in a job execution, thereby to interrupt the job being executed. If it is not involved in job execution, the processing unit 32 leaves the interrupt flag ORF at "0". The processing unit 32 first commands the processing unit 22 to read that message JM out of the receiving buffer area 243 (at a process 801 of FIG. 7(A)). Then, the processing unit 22 reads that message JM out of the area 243, transfers the same to the processing unit 32 and deletes part of the message JM from the area 243. In this regard, the sender address SA and the sequence number DN of that message JM are held in the area 243 for a predetermined time so that they may be used to prevent the same message JM from being received twice or more, after which this data is also deleted.

The processing unit 32 detects that the code data of that message JM is CD and judges that the message JM is a job occurrence message (at a process 803). Next, the job occurrence message is stored into the job occurrence message storage area 342 (at a process 807).

Here, it is desirable that the newly occurring job be executed by the information processor having the least load. In the embodiment being described by way of example, a relative time RT from the instant when the job occurrence message is received at each processor to the instant when the processor is available for executing that job is used as an index for indicating the load condition of the processor. When the information processor receives the job occurrence message during the execution of another job, it becomes available for executing the job of that message after it has executed that other job. When the information processor receives that message while it is doing no job, on the other hand, it instantly becomes available. Therefore, the processor has less load if it has a shorter relative time RT before it becomes available. The processes of calculating that relative time RT are performed at steps 807 to 813 in the following manner.

It is judged whether or not the aforementioned interrupt flag ORF is "1" (at the process 807). When the flag ORF is "0", there is no job being executed so that the newly occurring job of the received message can be instantly executed, and a buffer area 345 is partially set to be "0" as the relative time RT in such a processor (at the process 808). When the flag ORF is "1", there is a job to be interrupted, and the start is effected, after a set timer 104 for setting the relative time RT, as shown in FIG. 2, has been set to be "0", so that the time RT before the job is completed may be measured (at the process 809). Next, the interrupt flag ORF is reset to be "0" (at the process 810), and the execution of the interrupted job is restarted (at the process 811). After the execution of the interrupted job has been completed (at the process 812), the value of the timer 104 at that time is set as the relative time RT in a portion of the buffer area 345 (at the process 813).

Next, the generation of a random variable is executed to generate a random variable RV, which is set in a portion of the buffer area 345. Then, this buffer area 345 is set with a candidacy code $CD_2$ (which identifies a message as a candidacy message), the content code CC (which is the code SAB indicating the abnormality of the signal device) of the job occurrence message stored in the area 342, and a code PSDA (which is the number SNO of the abnormal signal device, in this case) forming a part of the sub-data SD. Incidentally, combination of the content code CC and the code PSDA will be referred to as a "job code". The processing unit 32 sends the candidacy code $CD_2$, the job code TN, the relative time RT and the random variable RV, that have been set in the buffer area 345 in the manner described, to the transmission controller 20 (at a process 814).

Figure 8:
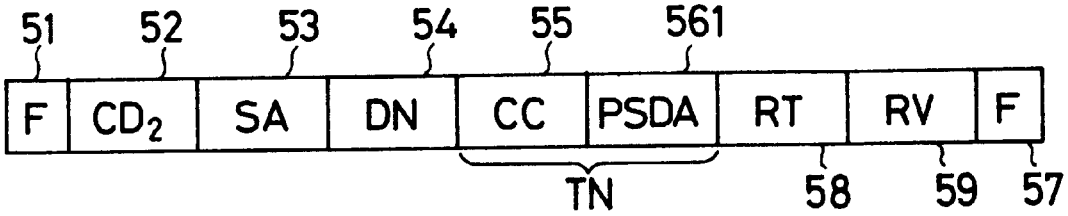
FIGS. 8 to 12 are schematic diagrams showing respective examples of candidacy, job execution declaration, job executing, job completion and abnormal broadcast messages according to the present invention.

The processing unit 22 of the transmission controller 20 thus having received that data sets a candidacy message CM shown in FIG. 8 in the sending buffer area 244 similarly to the aforementioned case in which the job occurrence message JM is formed. The areas 51 and 57 of that message CM are set with the flags indicating the starting and ending portions of the message. The area 52 is set with the received code data $CD_2$ indicative of the candidacy message CM. The area 53 is set with the sender address SA. The area 54 is set with the sequence number DN. The area 55 is set with the content code CC. An area 561 is set with the code PSDA. An area 58 is set with the relative time RT. An area 59 is set with the random variable RV.

The processing unit 22 sends a copy of the candidacy message CM stored in the sending buffer area 244 to the transmission line 1 and takes that copy out of the transmission line 1 similarly to the case of the job occurrence message JM if the copy circulates once and returns. Incidentally, in the case of the job occurrence message JM, the same job occurrence message JM as the copy having once circulated and returned is merely erased from the sending buffer area 244. In the case of the candidacy message CM, however, the same message CM as the copy having once circulated and returned is additionally transferred to the receiving buffer area 243 immediately before it is deleted from the area 244.

Thus, the candidacy message CM is sent to the transmission line 1 from the plural processors 12, 13 and 14 which have received the job occurrence message JM.

In the manner thus far described, the candidacy message CM having been sent to the transmission line 1 is stored, irrespective of whether or not it is a self-transmitted message, in the receiving buffer areas 243 of the processors 11, 12, 13 and 14 in which the same content code as the content code CC of that message CM is in the content code table storage area 245.

The following processes are performed in the processors 11, 12, 13 and 14, respectively. Specifically, the processing unit 32 is informed similarly to the foregoing description by the processing unit 22 of the fact that the message has arrived at the receiving buffer area 243. If the processing unit 32 is executing another job when it receives that information, it sets the interrupt flag ORF to be "1". Otherwise, the processing unit 32 leaves the interrupt flag ORF at "0" (which will be merely called an "interrupting process"). The processing unit 32 reads that message out of the receiving buffer area 243 (at the process 801). Next, it is judged whether or not that message is a job occurrence message (at the process 803). The code of the area 52 of that message is $CD_2$ and is different from the code $CD_1$ indicative of a job occurrence message JM so that the process is advanced to step 821 of FIG. 7(B). Here, it is judged that the code of the area 52 of that message is $CD_2$ indicative of the candidacy message CM (at the process 821 of FIG. 7(B)), and this message CM is stored into a candidacy message storage area 343 (at a process 823).

When the candidacy message CM is the first such message received, a checking timer 105 for closing the candidacy, as shown in FIG. 2, is set to the initial state "0". Therefore, whether or not the candidacy message CM is the first such message received is judged in accordance with whether or not the timer 105 is "0" (at a process 825). In this regard, it will be recalled that each processor cable of candidacy will transmit a candidacy message. In case it is the first reception of such message, the candidacy closing timer 105 is started (at a process 827). In case it is not the first reception of such message, the start of the timer 105 is unnecessary so that the process is shifted without any execution of the process 827 to the interrupt releasing process composed of processes 829 and 831. If the interrupt flag ORF is "0" (at the process 829), more specifically, there is no job to be executed, the process ends. If the flag ORF is "1", the interrupt flag is reset to be "0" to execute the interrupted job, and the process ends after the completion of that job (at the process 831).

If the timer value of the candidacy checking timer 105 reaches a predetermined time $T_1$ which is slightly longer than that for the candidacy message CM to once circulate the loop, the time-up signal is fed to the processing unit 32 and is left at the value $T_1$. The processing unit 32 is informed by the time-up signal of the fact that the candidacy is closed, and performs the aforementioned interrupting process. Next, the candidacy message of the area 343 is examined to select the processor to execute the job (at a process 833 of FIG. (C)). In case there is only one message CM in the area 343, the processor which is indicated by the address SA of that message CM is selected. In case there are a plurality of messages CM in the area 343, the message having the shortest relative time RT is selected from the respective messages CM. If there is one message CM having the shortest time, the processor indicated by the address SA of that message CM is selected. If there are two or more messages CM having the same shortest time, the random variables RV of that message are compared to select the message CM having the smallest random variable RV. If two or more messages CM having the same shortest time and random variable are found, their addresses SA are compared to select the message CM having the smallest address SA and to select the processor indicated by the address SA of that message.

At these processes, incidentally, in case where two or more messages CM are found in which both the relative times RT and the random variables RV are the same minimum values, that selecting process 833 may be executed again after new random variables RV are generated at the respective processors indicated by the addresses SA of those messages CM and after the candidacy messages having their random variables RV renewed are newly sent from the respective processors. Thus, the address SA of the single processor selected is stored as the address JA in the area 344.

It is judged whether or not the single processor thus selected is the processor itself (at a process 835). More specifically, it is judged whether or not the sender address SA of the single message selected at the process 833 coincides with the address of the area 241 itself. The result is that the job of the message CM is executed by the processor itself, if the coincidence takes place, and is monitored unless otherwise controlled.

Now, let it be assumed that the job identified in the candidacy message CM is executed by the processor 12 so that the job execution is monitored by the processors 11, 13 and 14.

(3) Execution of Job

At the processor 12, the process is shifted from 835 to 837. The processing unit 32 of the processor 12 sends both a job execution declaration code $CD_3$ and a job code TN to be executed to the transmission controller 20. The latter job code TN is a copy of the job code of the message CM in the area 343, which is solely selected at the process 833.

Figure 9:
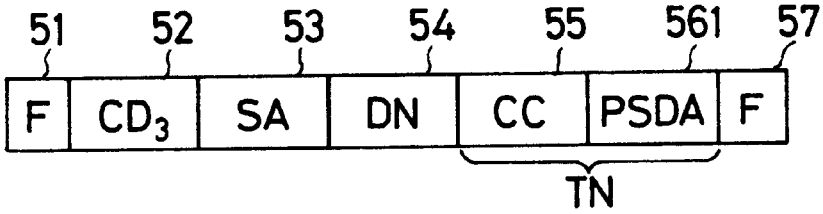

The transmission controller 20 thus having received the codes $CD_3$ and TN executes the processings similar to the aforementioned ones to set into the sending buffer area 244 a job execution declaration message DCM which is shown in FIG. 9. The transmission controller 20 then sends the copy of that message DCM to the loop transmission line 1 and deletes the message DCM from the sending buffer area 244 after the message DCM has once circulated through that transmission line 1 and returned. Thus, the sending operation of the job execution declaration message DCM ends.

Figure 10:
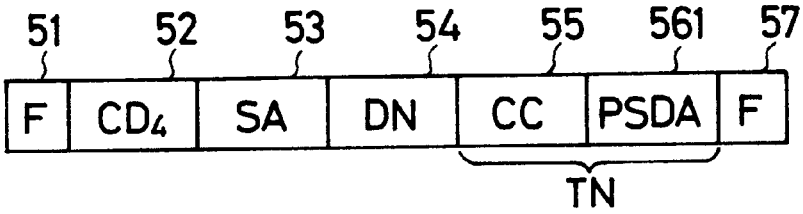

The processing unit 32 reads the content code CC of the job occurrence message JM out of the area 342. In accordance with the content code CC thus read out, one program is selected from those which are stored in plural in advance in an area 341. In case a signal device becomes abnormal, a signal device abnormality analyzing program is selected because the content code is the signal device abnormality code SAB. Then, the execution of the job for analyzing the data SDA of that message JM with that selected analyzing program is started. The processing unit 32, while executing that job, sends a job executing message BM, as shown in FIG. 10, through the transmission controller 20 for a predetermined period $T_0$ similarly to the aforementioned process. That message BM has its code $CD_4$ indicating the job executing message.

After completion of the execution of that job, the processing unit 32 stores a code $CD_5$ indicative of the job completion, the code TN of that job and data D indicative of the result of the job execution into the buffer area 345. Then, those job codes and the data D indicating the result of the job execution are transmitted to the I/O device 40 via interface 33 so that they are displayed (at a process 839). In the case of the abnormal signal device, the I/O device 40 for informing the signal maintenance man responds to the job code TN to display the number of the signal devices which is abnormal together with the state thereof, the cause for the abnormality and so on in response to the result data D.

Figure 11:
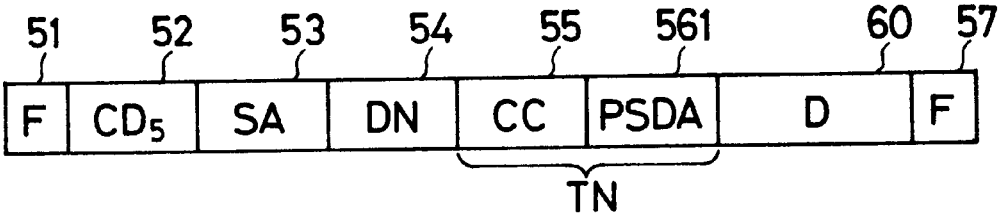

Then, the codes $CD_5$ and TN and the result data D of the buffer area 345 are sent to the transmission controller 20. This transmission controller 20 sets a job completion message EM, as shown in FIG. 11, in the sending buffer area 244 and sends the copy of that message EM to the loop transmission line 1, both similarly to the aforementioned process, until it deletes that message EM from the sending buffer area if that copy once circulates and returns. The processing unit 32 clears the areas 341 to 345 to zero and resets the timers 104 to 107 to be "0", thus leading to the end state (at the process 841).

Incidentally, since the interrupt flag ORF for the job execution is "0", there is no necessity for the resetting operation after the end of a process 841.

(4) Monitor of Job Execution

At the processors 11, 13 and 14, the process is shifted from 835 to 836. In the step 835, the processors 11, 13 and 14 have determined that they are not selected to execute the job, and in this case, the timer 106 therein is reset and started for monitoring whether or not the job execution declaration message DCM is normally sent by the selected processor 12. After that, the interrupt releasing processes (i.e., the processes 829 and 831 of FIG. 7(B)) are executed.

The processor (e.g., the processor 12 in this case) for the job execution is monitored in accordance with whether or not the timer 106 is timed out (which will be described in detail hereinafter). In other words, whether or not the job execution declaration was normally effected.

In case the processor 12 is normal, the job execution declaration message DCM of FIG. 9 is sent from the processor 12 and is received by the processors 11, 13 and 14 similarly to the foregoing description. At each of the processors 11, 13 and 14, the processing unit 32 executes the aforementioned interrupting process and then the processes 801 and 803 of FIG. 7(A) and the process 821 of FIG. 7(B) are performed, after which the operation is shifted to a process 851 of FIG. 7(D). In accordance with the fact that the code of the area 52 of that message DCM is $CD_3$, it is judged that the message DCM is the job execution declaration message, and the process is advanced to 852. At the time when the process is advanced to 852, the timer 106 has not timed out yet. The timer 106 is stopped, and then the timer 107 for monitoring whether or not the job is being normally executed at the processor 12 is set to be "0". After that, the aforementioned interrupt releasing process is executed.

The job executing processor 12 is monitored in accordance with whether or not the timer 107 is timed out (which will be described in detail hereinafter). Specifically, whether or not the job is being normally executed.

In case the processor 12 is normal, the message BM of the job execution shown in FIG. 10 is sent and received by the processors 11, 13 and 14, as has been described hereinbefore. At each of the processors 11, 13 and 14, the processing unit 32 executes the aforementioned interrupting process and then the processes 801 and 803 of FIG. 7(A), the process 821 of FIG. 7(B) and the process 851 of FIG. 7(D) are performed, after which the operation is shifted to a process 853. In accordance with the fact that the code of the area 52 of that message BM is $CD_4$, it is judged that the message BM is the job executing message, and the process is advanced to 854. At the time when the process is advanced to 854, the timer 107 has not timed out yet. The timer 107 is reset to be "0". After that, the aforementioned interrupt releasing process is executed. Thus, while the job is being executed at the processor 12, the timer 107 is repeatedly rest to be "0" and started.

In case the processor 12 is normal, as has been described hereinbefore, the job completion message EM of FIG. 11 is sent and received by the processors 11, 13 and 14. At each of the processors 11, 13 and 14, the processing unit 32 consecutively executes the processes 801 and 803 of FIG. 7(A), the process 821 of FIG. 7(B) and the processes 851 and 853 of FIG. 7(D)), after the aforementioned interrupt releasing process has been executed, until it is shifted to a process 856. In accordance with the fact that the code of the area 52 of that message EM is $CD_5$, it is judged that the message EM is the job completion message, and the process is advanced to 857. At the time when the process is advanced to 857, the timer 107 is not timed out yet. This timer 107 is stopped and that message EM is stored in the buffer area 345. The job code TN of that message EM and the result data D are read out of the area 345 and are sent to the I/O device 40. In case the signal device is abnormal, the I/O device 40 for informing the signal maintenance man displays the number of the signal device which is abnormal in response to the job code TN together with the state of and cause for the abnormality and so on in response to the result data D. The processing unit 34 clears the area 341 to 345 to zero and resets the timers 104 to 107 to be "0", thus effecting the stop state (at the process 857).

Thus, the monitoring of the job execution is completed.

(5) Abnormal Detection and Processings therefor

The timer 106 of FIG. 2 is, as has been described hereinbefore, a timer for monitoring whether or not the job execution declaration was normally performed. The timer 106 is so constructed that it is timed out at a time $T_2$, which is slightly longer than the time for the job execution declaration message DCM to be sent from the job executing processor and to circulate once through the loop transmission line 1 and return, thereby to generate a time-up signal until it is stopped.

The timer 107 of FIG. 2 is, as has been described hereinbefore, a timer for monitoring whether or not the job is being normally executed. The timer 107 is so constructed that it is timed out at a time $T_3$, which is the summation of the sending period $T_0$ of the aforementioned job executing message BM and the time $T_3'$ for the message BM to circulate once through the loop and return, thereby to generate a time-up signal until it is stopped.

Figure 12:
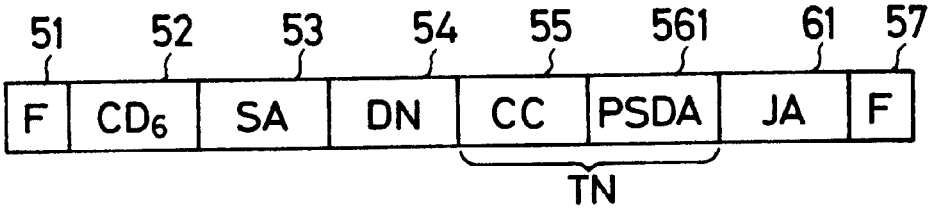

Therefore, the processing unit 32 judges, when it receives the time-up signal from the timer 106 or 107, that the job executing processor has become abnormal either during the time period from the candidacy to the declaration of the job execution or during the job execution. The processing unit 32 sends, after the execution of the aforementioned interrupting process, the address JA (which stored in the area 344) of the processor selected at the aforementioned process 833 of FIG. 7(C), the code $CD_6$ indicative of the abnormal broadcasting message and the job code TN to the transmission controller 20. This transmission controller 20 sets an abnormal broadcasting message AM of FIG. 12 in the sending buffer area 243 and sends a copy of that message AM to the loop transmission line 1 both similarly to the foregoing description so that it deletes that message AM from the sending buffer area if the copy thereof once circulates and returns. It is judged whether or not there is in the area 343 the candidacy message CM which has the same sender address SA as the address JA of the area 344 (at a process 861 of FIG. 7(E)). If there is no message, the process to be taken because the processor of the address JA is abnormal (which process will be called a "countermeasure process", as will be detailed hereinafter) has been already completed. Therefore, not the countermeasure process but the aforementioned interrupt releasing process is executed, thus ending the processings. If that candidacy message CM is in the area 343, there is a necessity for that countermeasure process, and the process is advanced to 862. The processing unit 32 deletes the candidacy message CM, which has the same sender address SA as the address JA, from the area 342. After that, it is judged whether or not the candidacy message CM is in the area 343 (at a process 863). If there is no message having the same address, it is necessary to advance the process from the reception of the candidacy CM. Therefore, the candidacy closing timer 105 is reset and left to be "0" (at a process 864). After that, the aforementioned interrupt releasing process is performed. If there is a message CM having the same address, the timer 105 is reset to be "0" and is started (at a process 865), thus effecting the aforementioned interrupt releasing process.

Thus, the processes of the processors having detected the abnormality in the job executing processor are completed.

Figure 7A:
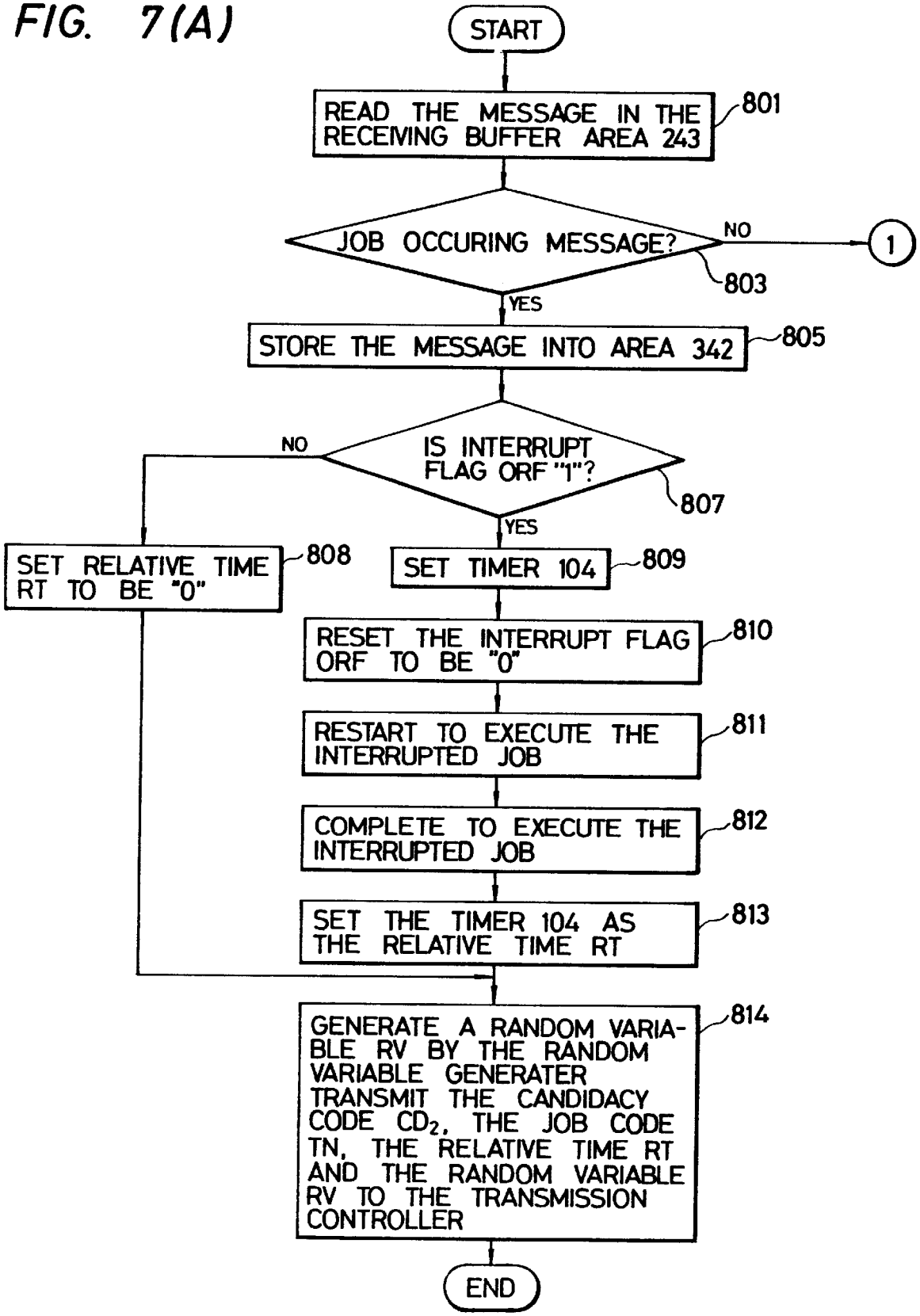
FIGS. 7(A) to (E) are flow charts showing one example of the processes of the processing units of the information processor of FIG. 2.
Figure 7B:
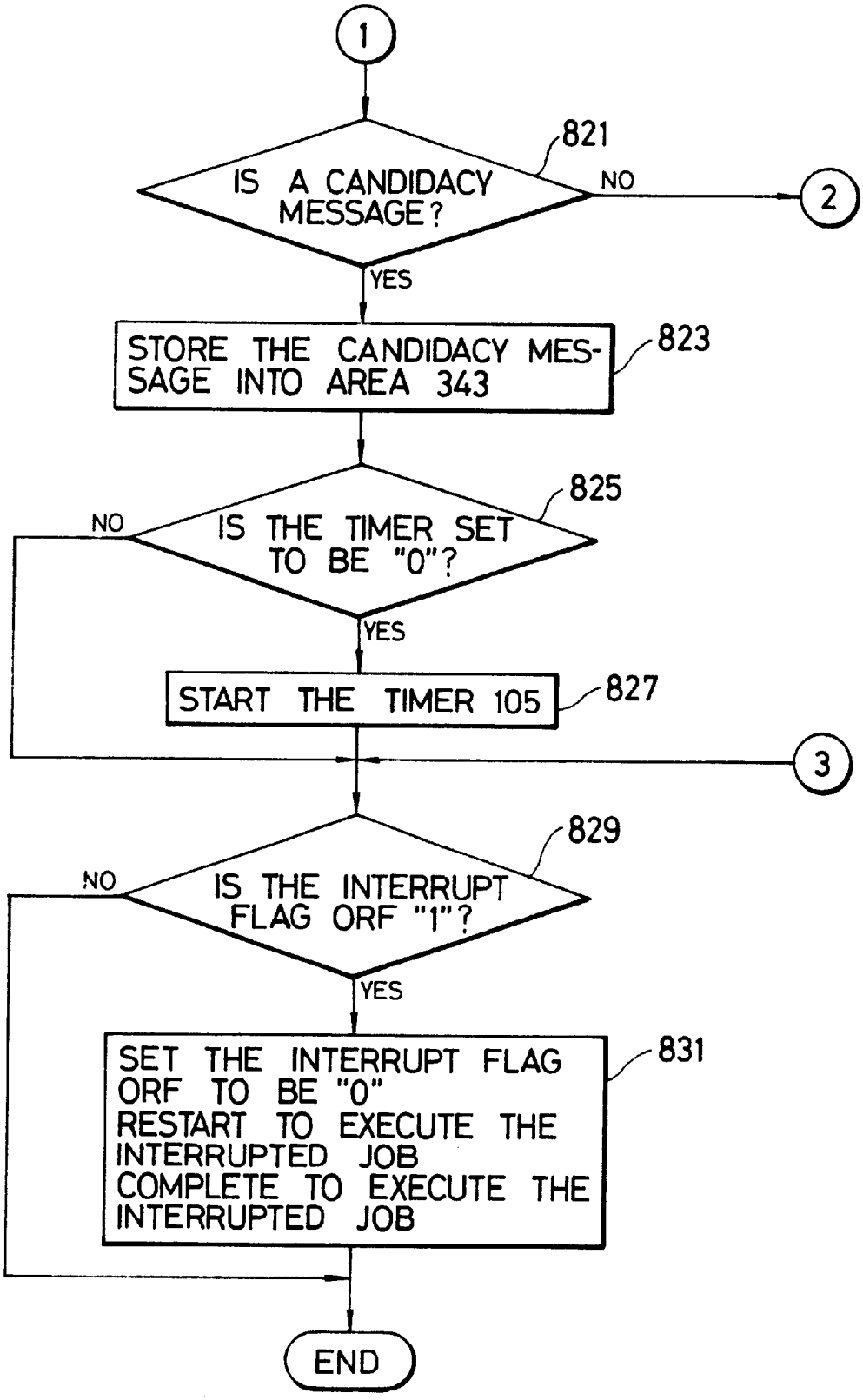
Figure 7C:
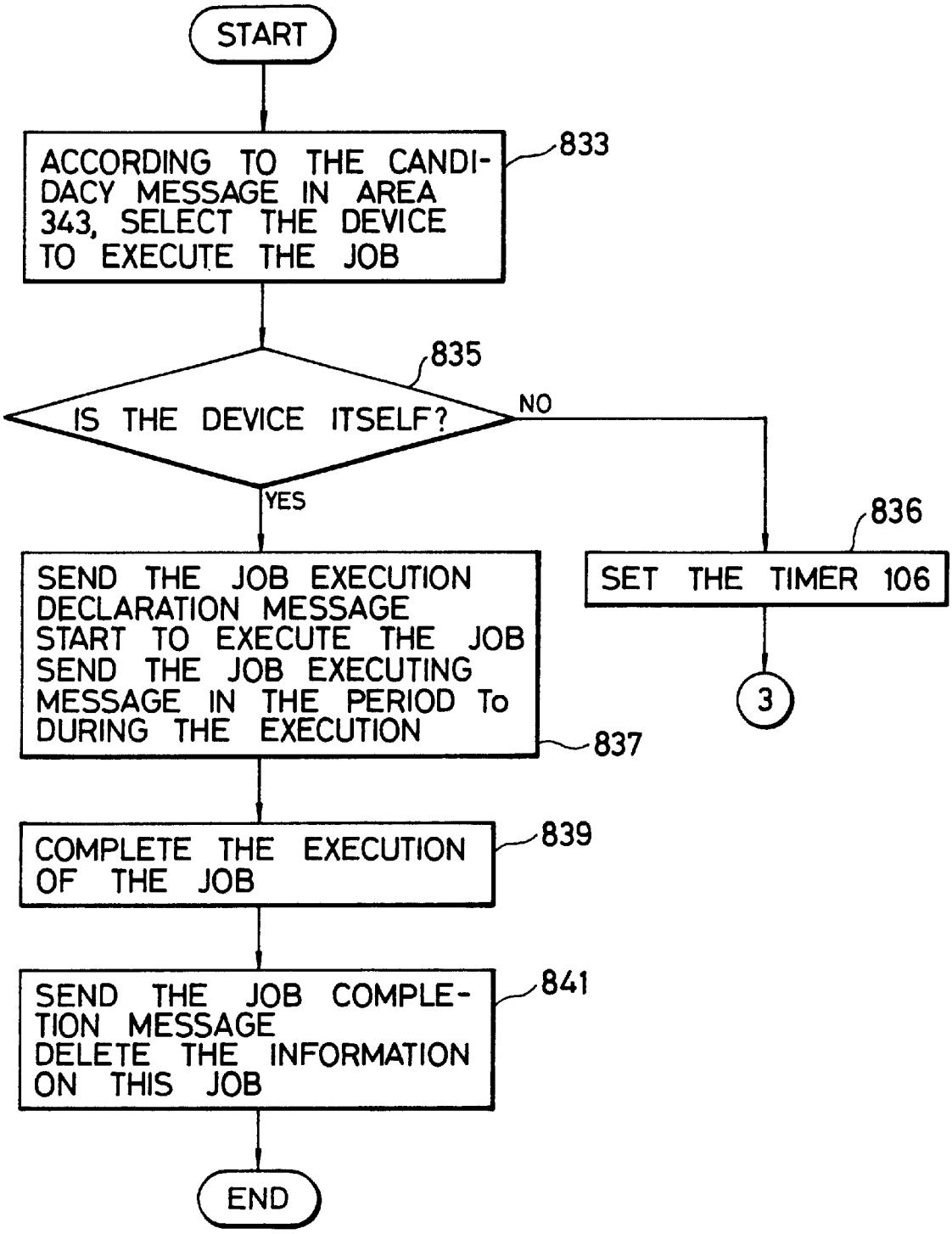
Figure 7D:
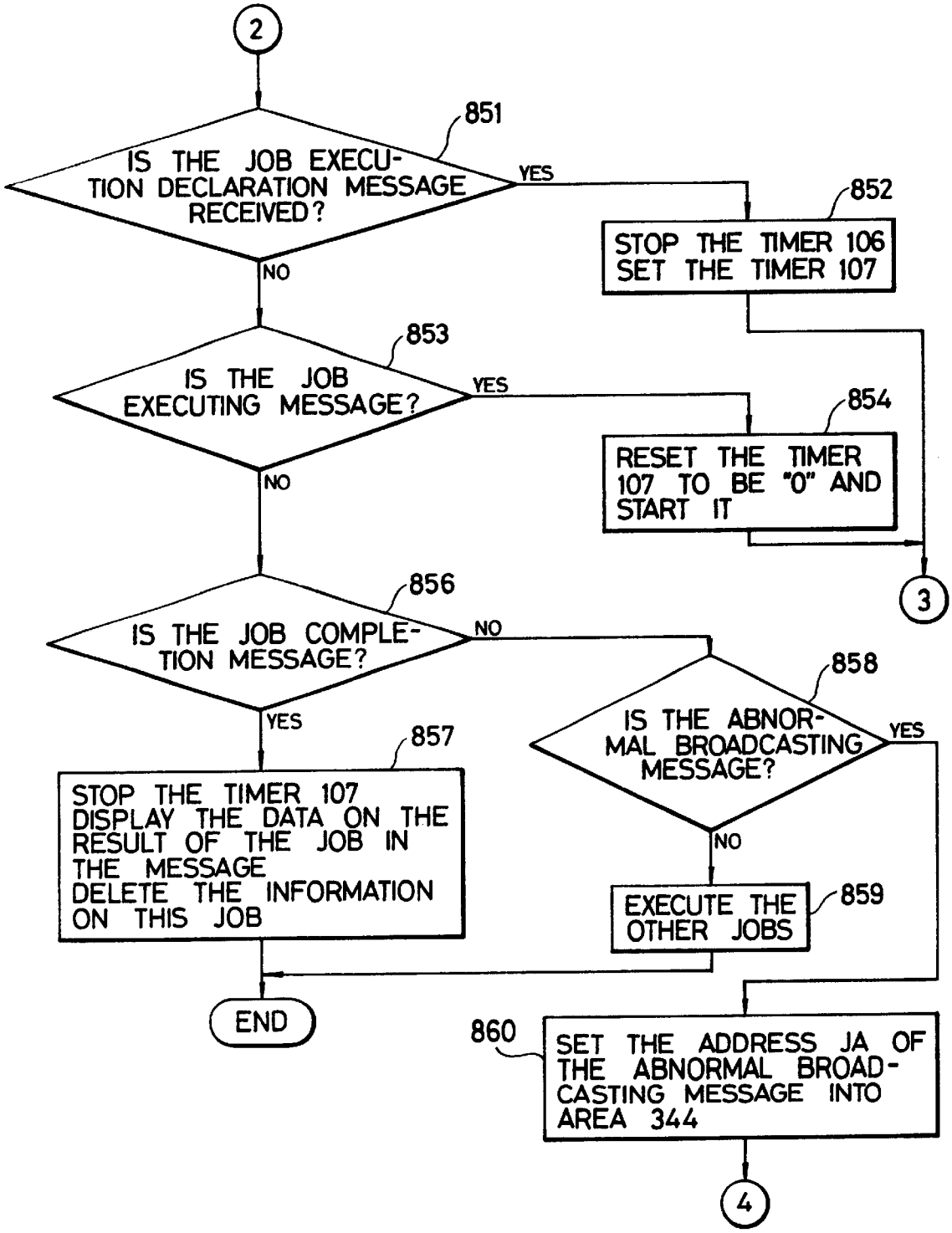
Figure 7E:
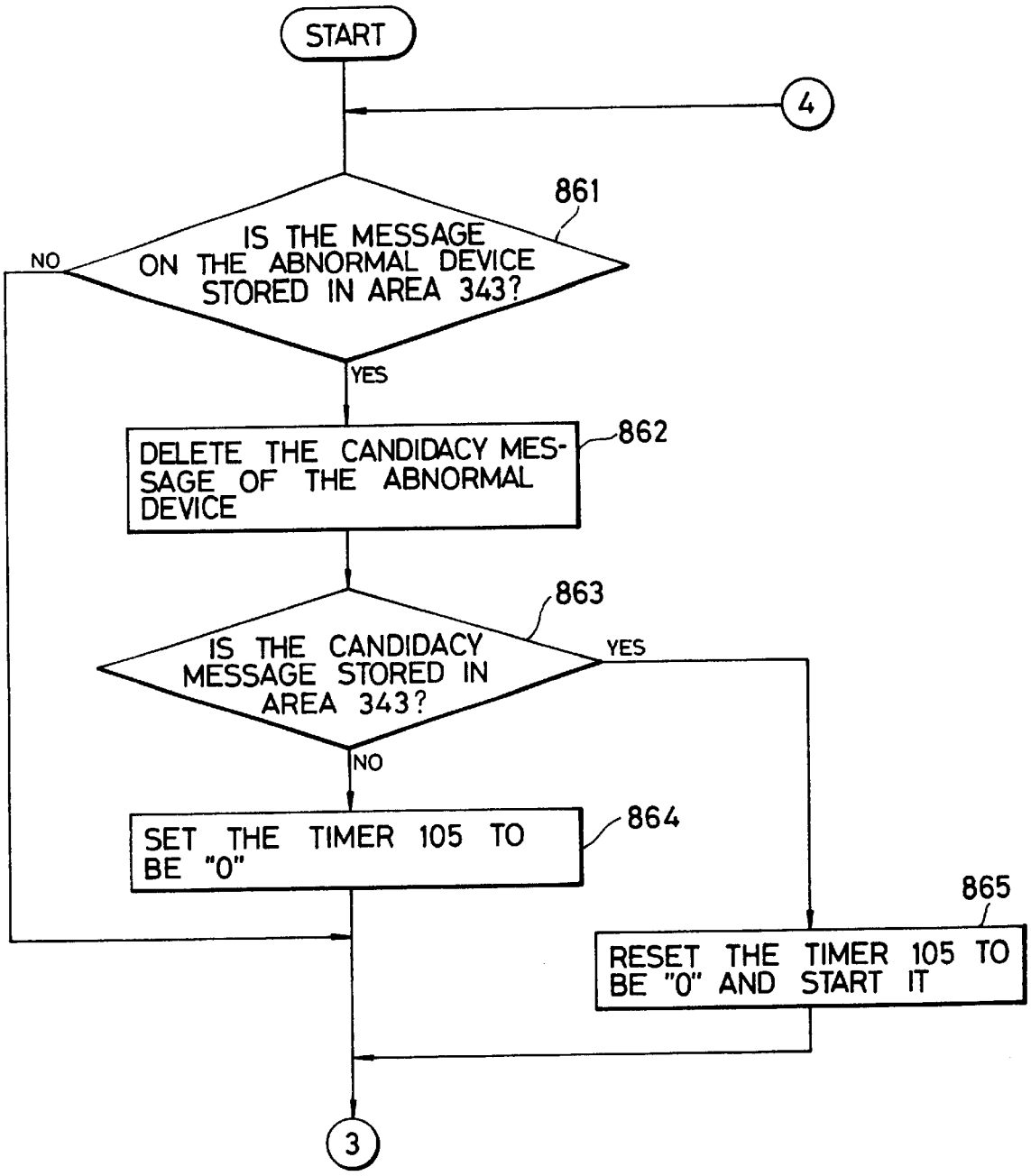

At the processor having received the abnormal broadcasting message AM from the transmission line 1, on the other hand, the processing unit 32 consecutively executes the processes 801 and 803 of FIG. 7(A), the process 821 of FIG. 7(B) and the processes 851, 853 and 856 of FIG. 7(D), after the aforementioned interrupting process, and detects that the code of the area of that message AM is $CD_6$, after which it is shifted to a process 860. The address JA of the area 61 of that abnormal broadcasting message AM is stored in the area 344. After that, the process is advanced to the aforementioned one 361, at which the same processing as the foregoing description is executed, so that the candidacy message CM (i.e., the candidacy message MC of the processor at an abnormal state) of the address JA is brought into a state at which it is deleted from the area 343.

As the time elapses, moreover, the respective timers 105 of the plural processors at the monitored state are timed out. The respective processors at the monitored state are shifted to the aforementioned process 833 of FIG. 7(C) in response to the time-up signals of their own timers 105 thereby to select the processor to execute the job in response to the candidacy message of the processor at the abnormal state. Therefore, the processor to execute the job is elected from the processors at the monitored state thereby to effect the job execution.

The processes thus far described are repeated on and on.

In case the processor 12 becomes abnormal, one processor 13 of the plural processors 11, 13 and 14 monitoring that processor 12 becomes the processor to execute the job, whereas the processors 11 and 14 monitor the processor 13. If the processor 13 becomes abnormal, too, one processor 11 of those monitoring processors 11 and 14 becomes the processor to execute the job, whereas the remaining processor 14 monitors the processor 11.

In the embodiment thus far described, incidentally, the relative time RT has been used to elect the processor to execute the job. Nevertheless, that relative time RT may be replaced by an accumulated load ratio P.

Here, this load ratio P is expressed by the following Equation:

$$P = \frac{\text{Accumulated Executing Time}}{\text{Accumulated Running Time}}.$$

In an alternative, a value PRT to be determined from the load ratio P and the relative time RT may also be used in place of the load ratio P.

Here, the value PRT is expressed by the following Equation:

$$PRT = f(P, RT),$$

(wherein f for a function).

On the other hand, the time-up periods of the timers 104 to 107 of the embodiment thus far described are naturally determined on the basis of both the transmission time (which contains the resending time of the message in case it is necessary due to noises or the like for the message to be sent again), which is either actually measured or calculated between the information processor and the transmission control, and the transmission time (which contains the resending time of the message in case it is necessary due to noises or the like for the message to be sent again or which is determined by considering a bypass passage when there is a possibility of forming the bypass passage) between the respective two of the information processors.

As has been described hereinbefore, according to the present invention, there can be attained the following advantages:

(1) The job can be executed without fail. Specifically, no matter what processor gets out of order and no matter when the disorder takes place, that job never fails to be backed up by another processor.

(2) The loads upon the respective processors can be averaged. Specifically, it is possible to execute the job by such a processor of the plural processors as is judged to have the lightest load.

(3) Sufficient expandability can be enjoyed. Specifically, the processors can be increased or decreased without any difficulty partly because the functions of the respective processors are identical and partly because the process neither depends upon the number of the processors of the system nor requires the address of the receiver.

What is claimed is:

1. A job processing method for operation of an information processing system which includes a plurality of information processing devices interconnected by means of a common transmission line, comprising:

a first step of detecting by at least one of said processing devices the occurrence of a job to be executed and transmitting from said one processing device a job occurrence message on said common transmission line, said job occurrence message including job content information characterizing the job to be executed;

a second step of receiving said job occurrence message from said transmission line at least at one of said plurality of processing devices other than the one processing device which has transmitted said message and storing said job content information in the processing device or devices which have received said job occurrence message; and a third step of starting the execution of said job, which is identified by stored job content information, in a candidate processing device selected from candidate processing devices including the processing device which has transmitted said job occurrence message and said processing devices receiving said job occurrence message, said selection occurring in response to a selection process carried out within each such processing device so that the processing device which executes said job selects itself for this function on the basis of its capabilities and those of the other candidate processing devices.

2. A job processing method according to claim 1, wherein said third step includes transmitting from each candidate processing device on said common transmission line a candidacy message which includes processing device capability information relating to the processing device transmitting said message, receiving the candidacy messages from said transmission line at each candidate processing device and judging in each candidate processing device whether that processing device is to execute said job on the basis of the received processing device capability information.

3. A job processing method according to claim 2, wherein said processing device capability information in each candidacy message includes current load information relating to the processing device transmitting that message, and said judging in each candidate processing device whether that processing device is to execute said job includes comparing the current load information in each received candidacy message and the current load information of the processing device itself.

4. A job processing method according to claim 3, wherein said judging in each candidate processing device is effected a predetermined time after a candidacy message is first received in that processing device.

5. A job processing method according to claims 1 or 3, wherein each processing device has stored therein job assignment information identifying one or more types of jobs to be executed by that processing device, and wherein said second step includes comparing the job content information in each job occurrence message transmitted on said common transmission line with job assignment information stored in each processing device, and, receiving a job occurrence message and storing the job content information thereof only in those processing devices which are assigned to execute the type of job identified by that job content information.

6. A job processing method according to claim 5, wherein plural processing devices store job assignment information identifying the same type of job.

7. A job processing method according to claim 2, further including:

a fourth step of monitoring the operation of said one candidate processing device which is executing said job by the other candidate processing devices to detect an abnormality in operation; and a fifth step of starting execution of said job, which is identified by stored job content information, in one of said other candidate processing devices in the case where an abnormality in the operation of said one candidate processing device is detected during the monitoring of the operation thereof.

8. A job processing method according to claim 7, wherein said fourth step includes transmitting on said common transmission line from said selected candidate processing device a job execution declaration message immediately before said job execution is started and a job executing message during execution of said job, monitoring in said other candidate processing devices for the receipt of said job execution [deceleration] *declaration* message and job execution message on said common transmission line within predetermined times after receipt therein of a first job occurrence message, and detecting an abnormality in the operation of said selected candidate processing device when said job execution declaration message or said job execution message is not received within said predetermined times.

9. A job processing method according to claims 7 or 8, wherein said fifth step includes transmitting an abnormal broadcasting message on said transmission line when an abnormality is detected in the operation of said selected candidate processing device, receiving said abnormal broadcasting message in the other of said candidate processing devices, and starting execution of said job in one of said other candidate processing devices on the basis of the processing device capability information in the originally received candidacy message.

10. A job processing method according to claim 9, wherein said processing device capability information in each candidacy message includes current load information relating to the processing device transmitting that message, and said judging in each candidate processing device whether that processing device is to execute said job includes comparing the current load information in each received candidacy message and the current load information of the processing device itself.

*11. A job processing method according to claims 1 or 3, wherein each processing device has stored therein job assignment information identifying one or more types of jobs to be executed by that processing device in terms of the type of data required thereby, and wherein said second step includes comparing the content code in each job occurrence message transmitted on said common transmission line with job assignment information stored in each processing device, and, receiving a job occurrence message and storing the data thereof only in those processing devices which are assigned to execute the type of job requiring data identified by that content code.*

12. A job processing method for operation of an information processing system which includes a plurality of information processing devices interconnected by means of a common transmission path comprising:

a first step of detecting by at least one of said processing devices the occurrence or completion of a job to be executed and transmitting from said one processing device a job occurrence or completion message on said common transmission path, said job occurrence or completion message including data necessary for execution of the job and a content code which indicates the content of said data;

a second step of receiving said job occurrence or completion message from said transmission path by at least one other processing device other than the processing device which has transmitted said message;

a third step of identifying the job at said other processing device based upon a content code of the received message;

a fourth step of executing the identified job at said other processing device;

a fifth step of monitoring, by means of at least one of said processing devices, the status of operations of other processing devices based on said content code included in said message, wherein an information processing device the job of which corresponds to said occurrence or completion of a job is a candidate processing device which is selected in response to a selection process carried out within each processing device which selects itself on the basis of its capabilities and those of the other candidate processing devices.

13. A job processing method according to claim 12 wherein each of said processing devices which executed said job sends information related to results of job execution in said fourth step to said transmission path as a message containing a content code.

14. A job processing method according to claim 12, wherein said fourth step includes transmitting from each candidate processing device on said common transmission path a candidacy message which includes processing device capability information relating to said job corresponding to said occurrence of a job, receiving said candidacy messages from said transmission path at each candidate processing device and judging in each candidate processing device whether that processing device is to execute said job on the basis of the received processing device capability information.

15. A job processing method according to claim 14, wherein said processing device capability information in each candidacy message includes current load information relating to the current load of the processing device transmitting that message, and said judging in each candidate processing device whether that processing device is to execute said job includes comparing the current load information in each received candidacy message and the current load information of the processing device itself.

16. A job processing method according to claim 15, wherein said current load information is the time length of relative time from the instant when a job occurrence or completion message is received in a processing device to the instant when the processing device is available for executing a job.

17. A job processing method according to claim 15, wherein said judging in each candidate processing device is effected a predetermined time after a candidacy message is first received in that processing device.

18. A job processing method according to claim 12, wherein plural processing devices store said content code which indicate job assignment information identifying the same type of job in said plural processing devices.

19. A job processing method according to claim 12, wherein said fifth step includes:

a step of monitoring the operation of said candidate processing device which is executing said job to detect an abnormality in operation; and said fourth step includes:

a step of starting execution of said job, which is identified by said content code stored in the case where an abnormality in the operation or said candidate processing device is detected during the monitoring of the operation thereof.

20. A job processing method according to claim 11, wherein said fourth step includes transmitting on said common transmission path a job execution declaration message immediately before said job execution is started and a job executing message during execution of said job.

21. A job processing method according to claim 20, wherein said fifth step includes monitoring other candidate processing devices executing said job by detecting an abnormality in the operation of said candidate processing device executing said job when said job execution declaration message or said job execution message is not received within predetermined times.

22. A job processing method according to claims 19 or 21, wherein said fourth step includes transmitting an abnormality broadcasting message on said transmission path when an abnormality is detected in the operation of said candidate processing device, receiving said abnormality broadcasting message in the other of said candidate processing device, and starting execution of said job in one of said other candidate processing devices on the basis of the processing device capability information in the originally received candidacy message.

23. A job processing method in a system having a plurality of processing units, each processing unit being coupled to the other processing units through a transmission path and having means for executing a job, comprising:

a first step of transmitting from a first processing unit a message relating to a job to be executed;

a second step of receiving said message in at least a second processing unit other than said first processing unit which has transmitted said message;

a third step of selecting in either of said first or second processing units a job among jobs executable in said processing units based on information of at least one received message when at least first message is received from said one processing unit, said information indicating the content of said at least one message and includes information for permitting said message to be classified into different types; and a fourth step of executing the selected job in said first or second processing unit.

24. A job processing method according to claim 23, wherein said information is identified by processing content codes which represent contents of data included in a received message.

25. A job processing method according to claim 23, wherein said selecting is executed during a time period in which said information is set to be obtained.

26. A job processing method according to claim 23, wherein said information is the data in connection with candidacy of a processing unit for executing a lob.

*27. A job processing method according to claim 23, wherein said information is data in connection with a content code and candidacy of processing unit for executing a job.*

*28. A job processing method for operation of an information processing system which includes a plurality of information processing devices interconnected by means of a common transmission path, comprising:*

*a first step of transmitting from one processing device a message relating to a job occurrence on said common transmission path, said message including data relating to the job to be executed and a content code which indicates the content of said data;*

*a second step of receiving said message from said transmission path in at least one processing device based on said content code;*

*a third step of identifying a job to be executed, in a processing device which has received said message, based on the content code of the received message, said content code indicating the content of said message and includes information for permitting said message to be classified into different types; and*

*a fourth step of executing the identified job in a processing device which has identified said job.*

*29. A job processing method according to claim 28, which further includes a fifth step of monitoring, in at least one of said processing devices, the status of other processing devices which are executing jobs.*

*30. A job processing method for operation of an information processing system which includes a plurality of information processing devices interconnected by means of a common transmission path, comprising:*

*a first step of executing a job based on information of a first message received from said common transmission path, said information indicating the content of said first message, and transmitting from at least one of said processing devices a second message on said common transmission path, said second message including status information for indicating the status of the processing device itself during execution of said job;*

*a second step of receiving, in at least one processing device other than the transmitting processing device, said second message from said transmission path; and*

*a third step of monitoring, in at least one of said processing devices, the status of other processing devices based on said status information included in said second message;*

*wherein said first message includes data necessary for execution of a job and a content code as said information indicating the content of said data and includes information for permitting said data to be classified into different types and said second step comprises a step of selectively receiving said first message from said transmission path based on said content code in said first message.*

*31. A job processing method for operation of an information processing system including a plurality of information processing devices interconnected by means of a common transmission path for processing a job, comprising:*

*a first step of transmitting, from at least one of said processing devices, a message including data necessary for execution of a job and a content code which indicates the content of said data and includes information for permitting said data to be classified into different types;*

*a second step of receiving and selectively accepting said message, in at least one of said processing devices other than the transmitting processing device, based on said content code in said message;*

*a third step of selecting a program executable in the accepting processing device based on said content code of a received message; and*

*a fourth step of executing the selected program in the accepting processing device.*

*32. A job processing method for operation of an information processing system which includes a plurality of information processing devices interconnected by means of a common transmission line, comprising:*

*a first step of detecting by at least one of said processing devices the occurrence of a job to be executed and transmitting from said one processing device a job occurrence message on said common transmission line, said job occurrence message including data necessary for execution of a job and a content code which indicates the content of said data;*

*a second step of receiving said job occurrence message from said transmission line in at least one of said plurality of processing devices other than the one processing device which has transmitted said message and storing said job content information in the processing device or devices which have received said job occurrence message; and*

*a third step of starting the execution of the job, which is identified by stored job content information, in a candidate processing device selected from candidate processing devices including the processing device which has transmitted said job occurrence message and said processing devices receiving said job occurrence message, said selection occurring in response to a selection process carried out within each such processing device so that the processing device which executes said job selects itself for this function on the basis of its capabilities and those of other candidate processing devices.*

*33. A job processing method in a system including a plurality of information processing devices interconnected by means of a common transmission path, wherein each of said information processing devices has a processor and first and second memories, comprising:*

*a first step of transmitting a message including data and a content code which represents the content of said data and includes information for permitting said data to be classified into different types;*

*a second step of previously storing in a processing device at least one content code which represents the content of data necessary to the processing device in said first memory;*

*a third step of storing programs to be executed in said second memory;*

*a fourth step of receiving and selectively accepting said transmitted message based on the content code thereof and the content code stored in said first memory; and*

*a fifth step of selecting a program stored in said second memory based on at least one content code in at least one message accepted from at least one other processing device and for executing the selected program.*

*34. A job processing method for operation of an information processing system which includes a plurality of information processing devices interconnected by means of a common transmission path, comprising:*

*a first step of transmitting from one processing device a message on said common transmission path, said mes-*

*sage including data and a content code which indicates the content of said data and includes information for permitting said data to be classified into different types;*

*a second step of receiving and selectively accepting said message from said transmission path in at least one processing device, based on the content code of said message;*

*a third step of determining a job related to said message and whether or not the job is to be executed in a processing device which has accepted said message, based on parameter information of at least that processing device; and*

*a fourth step of executing the job using the data of an accepted message upon determination that a job is to be executed in the processing device which has accepted said message.*

*35. A job processing method for operation of an information processing system which includes a plurality of information processing devices interconnected by means of a common transmission path, comprising:*

*a first step of transmitting from one processing device a message relating to a job to be executed on said common transmission path;*

*a second step of receiving said message from said transmission path in at least one processing device, based on information included in said message indicating the content of said message and includes information for permitting said message to be classified into different types;*

*a third step of determining whether or not a job is to be executed in a processing device which has received said message, based on parameter information of the receiving processing device; and*

*a fourth step of executing the job using the data of the received message, when it is determined that the job is to be executed, in the processing device which has received said message.*

*36. A job processing method according to claim 39 or 35, which further includes a fifth step of monitoring in at least one of said processing devices, the status of other processing devices which are executing jobs.*

*37. A job processing method according to claim 34 or 35, wherein said parameter information includes at least one of loading information and a random number.*

*38. A job processing method for operation of an information processing system which includes a plurality of information processing devices interconnected by means of a common transmission path comprising:*

*a first step of detecting by at least one of said processing devices the occurrence or completion of a job to be executed and transmitting from said one processing device a job occurrence or completion message on said common transmission path, said job occurrence or completion message including data necessary for execution of the job and a content code which indicates the content of said data;*

*a second step of receiving said job occurrence or completion message from said transmission path by at least one other processing device other than the processing device which has transmitted said message;*

*a third step of identifying the job at said other processing device based upon a content code of the received message;*

*a fourth step of selecting from a processing device which has transmitted a job occurrence message and said processing devices receiving said job occurrence message a processing device to execute said job, said selection occurring in response to a selection process carried out within each processing device so that the processing device which executes said job selects itself to execute said job on the basis of its capabilities and the capabilities of the other processing devices;*

*a fifth of executing the identified job at said selected processing device;*

*a sixth step of monitoring, by means of at least one of said processing devices, the status of operations of other processing devices based on said content code included in said message.*

*39. A job processing method for operation information processing system which includes a plurality of information processing devices interconnected by means of a common transmission path, comprising:*

*a first step of transmitting from one processing device a message relating to a job occurrence on said common transmission path, said message including data relating to the job to be executed and a content code which indicates the content of said data;*

*a second step of receiving said message from said transmission path in at least one processing device;*

*a third step of identifying a job to be executed, in a processing device which has received said message, based on the content code of the received message;*

*a fourth step of selecting from the processing device which transmitted said message and said processing devices which received said message, a processing device to execute the identified job, said selection occurring in response to a selection process carried out within each processing device no that the processing device which executes said job selects itself to execute said job on the basis of its capabilities and the capabilities of the other processing devices; and*

*a fifth step of executing the identified job in the selected processing device.*

*40. A job processing method in a system including a plurality of information processing devices interconnected by means of a common transmission path, wherein each of said information processing devices has a processor and first and second memories, comprising:*

*a first step of transmitting a message including data and a content code which represents the content of said data and includes information for permitting said data to be classified into different types;*

*a second step of previously storing in a processing device at least one content code which represents the content of data necessary to the processing device in said first memory;*

*a third step of storing programs to be executed in said second memory;*

*a fourth step of receiving and selectively accepting said transmitted message in at least one of said processing devices other than the transmitting processing device the accepting being carried out in each receiving processing device and being selectively based on the content code thereof and the content code stored in said first memory; and*

*a fifth step of selecting a program stored in said second memory based on at least one content code in at least one message accepted from at least one other processing device and executing the selected program.*

*41. A job processing method for operation of an information processing system which includes a plurality of*

*information processing devices interconnected by means of a common transmission path, comprising:*

*a first step of transmitting from a processing a device a message on said common transmission path, said message including data and a content code which indicates the content of said data and includes information for permitting said data to be classified into different types;*

*a second step of receiving and selectively accepting said message from said transmission path in at least one processing device, based on the content code of said message;*

*a third step of determining a job related to said message and whether or not the job is to be executed in the at least one processing device which has accepted said message, based on parameter information of at least that processing device; and*

*a fourth step of executing the job using the data of an accepted message upon determination that a job is to be executed in the at least one processing device which has accepted said message.*

* * * * *